H. P. DOLSON.
Spring-Couplings for Vehicles.

No. 142,901.  Patented September 16, 1873.

Witnesses:
A. E. H. Johnson
H. Hamilton Johnson

Inventor:
Hacaliah P. Dolson
By
C. Storrs
His Attorney

UNITED STATES PATENT OFFICE.

HACALIAH P. DOLSON, OF HIGHLAND, NEW YORK.

IMPROVEMENT IN SPRING-COUPLINGS FOR VEHICLES.

Specification forming part of Letters Patent No. 142,901, dated September 16, 1873; application filed September 1, 1873.

*To all whom it may concern:*

Be it known that I, HACALIAH P. DOLSON, of Highland, in the county of Ulster and State of New York, have invented new and useful Improvements in Spring-Couplings for Vehicles, of which the following is a specification:

My present invention is an improvement on that patented to me May 21, 1872, in which the slides or sleeves to which the springs are connected are constructed for the attachment of what is known as the French-head spring; and as the coupling can be used with equal advantage for curled-end springs, my present improvements relate only to such feature of adaptability of the coupling, and which consists in providing the bearing sleeves or slides with laterally-projecting arms, between which the curled ends of the springs are secured, and thereby obtain a connection suitable for either the French head or curled-end spring with one and the same slide-bearing, which is an important advantage in the use of such springs; the object of my invention being to obtain a firm sliding bearing for the side springs, and relieve them from sudden strain and twisting.

Figure 1:
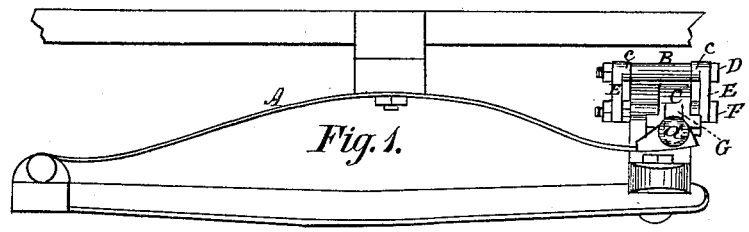
Figure 2:
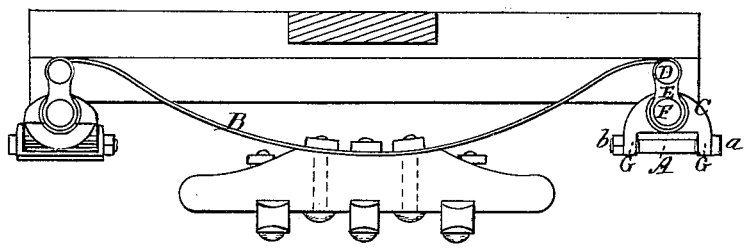
Figure 3:
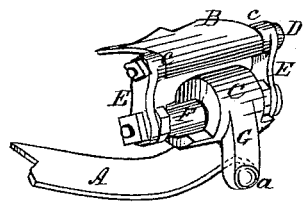
Figure 4:
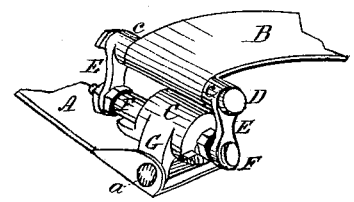

In the accompanying drawings, Figure 1 represents a side view of a portion of the running-gear of a vehicle. Fig. 2 represents an end view of the same. Fig. 3 represents a view, in perspective, of the sliding bearing, showing its connection with a curled-end spring. Fig. 4 represents a similar view of the sliding bearing connected by the same arms with a French-head spring; and Fig. 5, a perspective view of the said sliding-armed bearing.

The side and end springs A B are connected to each other as shown and described in my patent aforesaid, and need not here be particularly described. The side springs A are secured to the sleeves or slides C, and the end springs B to the same by horizontal bearing-bolts D, by means of vertical arms E E, pivoted to the ends of the bearing-bolts F for the slide, and to bearing-bolts D for the end springs. The connection of the side spring A with its slide C is at right angles to the bearing-bolts D F, so that the sleeves C can have a sliding movement at right angles to the swinging movement of the pivoted arms independent of each other to relieve the springs from being subjected to any strain from sudden twisting or other torsion caused by the descent of the springs.

Figure 5:
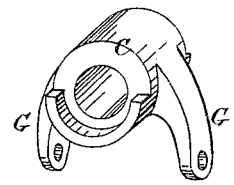

The kind of springs usually employed for wagons are known as the French head, having projecting side ears for fastening it, and the curled-end spring for embracing a bearing-bolt, as shown in Fig. 4; but hitherto no means have been devised for securing, when desired, these differently-constructed spring-ends to a sliding bearing piece; and for this purpose I provide the latter with upwardly-extending side arms G G, between which the end of either kind of spring is secured by a horizontal bolt, $a$, and nut $b$, the coiled end of the spring embracing the bearing-bolt $a$, between the arms G, as shown in Figs. 2 and 3, or the ears of the French spring will lap with the said arms, so as to be secured by the bolt $a$ passing through the arms, as shown in Figs. 1 and 5. The formation of these open arms G directly upon the lower side of the slides admits of the ready attachment of either form of spring. The sleeve or slide C has a movement upon its central bearing F in the direction of the length of the side spring, and in order to allow ample room for the slide the pivoted arms E are made with offsets $c$ on their inner sides, so that when a narrow spring, B, is used there will be sufficient room between the arms E, for the movement of the slide C, by the action of the spring.

In all other respects the spring-coupling is constructed and arranged for use as shown and described in my aforesaid patent.

Having described my invention, I claim—

1. The coupling sleeves or slides C of the side springs A, provided with downwardly-projecting arms G G, for adaptation to and attachment of either coiled or French head springs, as and for the purpose set forth.

2. The pivoted arms E, having offsets $c$, for the end springs B to allow of the use of narrow or wide springs without interrupting the sliding adjustment of the coupling-sleeve C upon its cylindrical bearing F, as set forth.

In testimony whereof I have hereunto set my hand this 9th day of November, A. D. 1872.

HACALIAH P. DOLSON.

Witnesses:
CHAS. F. DEGRAFF,
CHARLES JOHNSON.